(12) United States Patent
Suzuki (10) Patent No.: US 6,414,739 B2
(45) Date of Patent: Jul. 2, 2002

(54) METHOD OF MANUFACTURING A LIQUID CRYSTAL DISPLAY DEVICE

(75) Inventor: Seiji Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/774,615

(22) Filed: Feb. 1, 2001

Related U.S. Application Data (62) Division of application No. 09/190,007, filed on Nov. 12, 1998.

(30) Foreign Application Priority Data

Nov. 13, 1997 (JP) .............................. 9-311782

(51) Int. Cl.⁷ ..................... G02F 1/1339; G02F 1/1335; G02F 1/1333; G02F 1/13
(52) U.S. Cl. ..................... 349/155; 349/109; 349/110; 349/187
(58) Field of Search ................. 349/155, 106, 349/109, 110, 111, 42, 187

(56) References Cited

U.S. PATENT DOCUMENTS

| | | | |
|---|---|---|---|
| 4,626,073 A | 12/1986 | Amstutz et al. | 350/344 |
| 4,685,770 A | 8/1987 | Baeger | 350/344 |
| 4,705,360 A | 11/1987 | Funada et al. | 350/344 |
| 4,804,254 A | 2/1989 | Doll et al. | 350/344 |
| 4,904,056 A | 2/1990 | Castleberry | 350/333 |
| 4,966,442 A | 10/1990 | Ono et al. | 350/339 |
| 4,989,955 A | 2/1991 | Ito et al. | 350/344 |
| 5,040,875 A * | 8/1991 | Noguchi | 359/59 |
| 5,044,733 A | 9/1991 | Kamof et al. | 339/81 |
| 5,095,378 A | 3/1992 | Suzuki | 359/62 |
| 5,299,041 A | 3/1994 | Morin et al. | 359/59 |
| 5,381,256 A | 1/1995 | Hanyn et al. | 359/75 |
| 5,537,235 A | 7/1996 | Ishihara et al. | 359/81 |
| 5,566,013 A | 10/1996 | Suzuki et al. | 359/81 |
| 5,606,194 A | 2/1997 | Lebrum et al. | 257/433 |
| 5,684,552 A * | 11/1997 | Miyamoto et al. | 349/106 |
| 6,037,084 A * | 3/2000 | Ting et al. | 430/7 |
| 6,061,106 A * | 5/2000 | Ahn et al. | 349/83 |
| 6,144,435 A * | 11/2000 | Yokoyama et al. | 349/133 |

FOREIGN PATENT DOCUMENTS

| | | | |
|---|---|---|---|
| JP | 63-104021 A * | 5/1988 | |
| JP | 63-200122 A * | 8/1988 | |
| JP | 3-136021 | 6/1991 | |
| JP | 3-1478636 | 6/1991 | |
| JP | 4-93924 | 3/1992 | |
| JP | 6-258647 | 9/1994 | |
| JP | 6-331970 | 12/1994 | |
| JP | 8-49320 | 2/1996 | |
| JP | 8-62606 | 3/1996 | |
| JP | 8-194216 | 7/1996 | |
| JP | 9-96820 | 4/1997 | |
| JP | 9-160051 | 6/1997 | |
| JP | 9-218133 | 8/1997 | |
| JP | 9-244029 | 9/1997 | |
| JP | 9-258243 | 10/1997 | |
| KR | 97-66651 | 10/1997 | |
| KR | 97-67080 | 10/1997 | |

* cited by examiner

*Primary Examiner*—William L. Sikes
*Assistant Examiner*—Tarifur R. Chowdhury
(74) *Attorney, Agent, or Firm*—Sughrue Mion, PLLC (57) ABSTRACT

The liquid crystal display is composed of an array substrate on which TFTs are arranged as active switching elements in a matrix form and covered with an orientation film. On the facing surface of the opposing substrate as a color filter, a light shielding film, color layers of red, green, and blue are arranged. The area excluding the area covered by the light shielding layer is turned into a display pixel area, and the surfaces of the opposing substrate are covered with an orientation film. The cell gap g at the display pixel area is larger than spacers in the cell, and cell gaps of color layers, which are compressed, overlapping the light shielding layer are smaller than spacers. The liquid crystal molecules are not subjected to the anomalous orientation and the light leakage is avoided. An after-image characteristic can be eliminated by regulating the projection of the color layers.

13 Claims, 5 Drawing Sheets

METHOD OF MANUFACTURING A LIQUID CRYSTAL DISPLAY DEVICE

This is a divisional of application Ser. No. 09/190,007 (Confirmation No. Not Assigned) filed Nov. 12, 1998, the disclosure of which is incorporated herein by reference.

BACKGROUND OF THE INVENTION

1. Field of the Invention

This invention relates to a liquid crystal display device (LCD) and particularly relates to a wide image plane, color liquid crystal display device having a wide angle of visibility by an active matrix display system.

This application is based on Patent Application No. Hei 9-311782 filed in Japan, the content of which is incorporated herein by reference.

2. Background Art

In general, in a liquid crystal display device, a mode for driving the liquid crystal cell by a vertical electric field is most widely used, including a TN (twisted nematic) and an STN (super twisted nematic) modes. However, recently, a new driving mode by a transverse electric field (IPS) is now being intensively researched.

When a comparison is made between the above two driving modes in terms of an image quality of the liquid crystal cells, it is far more difficult to obtain the good image quality with the transverse electric field mode, due to the panel structure. In particular, an important factor which affects on the image quality is a spacer for maintaining the gaps of cells at a fixed space.

The spacer is a group of spherical beads for supporting a pair of substrates facing each other at a fixed spacing. One of a pair of substrates is a TFT (Thin Film Transistor) array substrate (hereinafter, called "an array substrate") using TFTs as switching elements for driving, and another one of the pair of substrates is a color filter substrate (hereinafter, called "an opposing substrate") on which three color layers of RGB (red, green, and blue) are coated. When assembling a display panel, these array substrate and the opposing substrate are adhered to form a cell, placing spacers therebetween. As the spacer beads, elastic organic materials such as a resin using divinylbenzene are generally used. Although inorganic materials such as silica are sometimes used, they are not the main material for the spacer because of a tendency to generate foams when the pressure is reduced.

When a comparison of a leakage of the light is made between the two types of liquid crystal panels, one driven by a vertical electric field and the other driven by a transverse electric field, the panel driven by the transverse electric field is more likely to cause light leakage than the panel driven by the vertical electric field.

One reason for the above result is based on the difference of the normal driving modes in a display operation. That is, for devices driven by the vertical electric field such as the TN mode or the STN mode devices, a normally-white mode is superior for increasing the contrast, while it is advantageous for better contrast to use a normally-black mode for devices driven by the transverse electric field. Thus, it is more likely for liquid crystal display devices driven by the transverse electric field to cause light leakage around spacers when the voltage applied to each cell is null.

The second reason is based on the difference of the driving directions of the liquid crystal. That is, when a device is driven by the vertical electric field, the liquid crystal is driven in the vertical direction perpendicular to a pair of substrates, while the liquid crystal is twisted horizontally when driven by the transverse electric filed. Consequently, a difference is caused in the orientation of liquid crystal by the direction of the electric field, especially in the direction of depth of the liquid crystal, causes an anomalous orientation around spacers by the transverse electric field to cause leakage of light.

The third reason is based on the presence of a chiral crystal. In the devices driven by the vertical electric field such as TN and STN devices, a rubbing direction of one substrate is rotated 90 degrees or 270 degrees against the rubbing direction of the orientation film formed on another substrate, and a chiral material is included in the liquid crystal for facilitating the twisted orientation at a desired direction. In contrast, in the devices driven by the transverse electric field, the rubbing directions of a pair of substrates are directions anti-parallel to each other, so that the orientation of the liquid crystal is homogeneous, and the liquid crystal does not contain the chiral material. Consequently, since the liquid crystal has a high degree of freedom in orientation when the device is driven by the transverse electric field, the liquid crystal around the spacers is thereby likely to be subjected to an anomalous orientation which can cause leakage of light when driven by the transverse electric field.

The liquid crystal molecules located around spacers are more likely to be subjected to the above anomalous orientation when the external force is applied on the cell. This is because the liquid crystal molecules are oriented around the spherical spacers by the external force.

Technical proposals for preventing deterioration of the image quality by spacers are presented in, for example, Japanese Patent Application, First Publication No. Hei 7-281195, entitled "a liquid crystal display panel"; and in Japanese Patent Application, First Publication No. Hei 7-281195, entitled "a liquid crystal display device and method of manufacturing the same".

Figure 5:
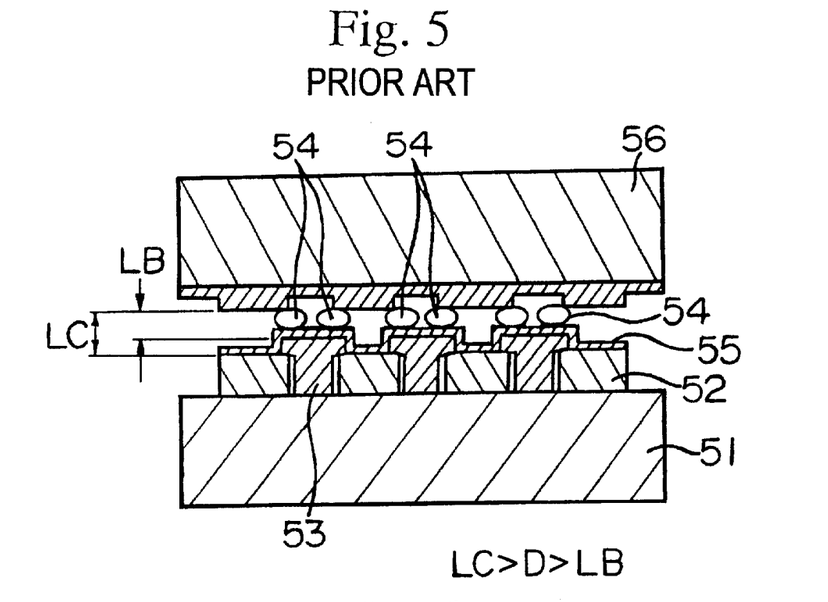
FIG. 5 is a diagram of a conventional example shown in the Japanese Patent Application, First Publication No. Hei 8-62606.

In the former Patent Application, as shown in FIG. 5, transparent and colored CF (Color Filter) layers 52 are disposed at an fixed intervals, black light shielding layers 53 are formed therebetween, and spherical spacers are scattered on the surface of the light shielding layer 53. Assume that distances from the CF filter layer 52 and the light shielding layer 53 to the opposing substrate 56 are LC and LB, and the diameter of spacer 54 is D, a dimensional relationship of the liquid crystal panel is represented as LC<D<LB.

The spacers on the light shielding layer are only held between the pair of the substrate 51 and 56. In contrast, spacers 54 on the color filter layer 52 fall downward toward the bottom in the liquid crystal between both substrates, when the panel is stood in an upright position. Thereby, spacers 54 are removed from the display pixel area 55 to prevent an anomalous orientation of the liquid crystal and thereby avoid the deterioration of the image quality.

An attempt of a mathematical analysis will be described. A size of the display cell of the liquid crystal display panel is generally within a range from 100 to 300 $\mu$m, and the cell gap between these cells are roughly 3 to 6 $\mu$m.

When the panel is stood in an upright position, a spacer located at the upper end of the screen area falls into the outer position of the screen without abutting the substrates. The standing angle $\theta$ of the panel is expressed as, $$\cos\theta = \text{cell gap/size of cells} = 6/100$$

From the above equation, a $\theta$ of 86.6° is obtained, corresponding to an angle when the spacer is considered as a "point".

The falling speed of the spherical spacers in the liquid crystal with a thickness of 100 μm can be calculated by the following Stokes' Equation, under a condition of Rep<2.

$$Vt = (\rho p - \rho f)gDp^2/18\,\mu$$
$$= 0.4\,(\mu m/sec)$$

where, ρp is a density of the spacer, which value is 1.1 to 1.3, when the spacer is made of organic materials such as divinylbenzene or styren resins; ρf is a density of the liquid crystal, which value is generally around 1.0 to 1.2; and μ is a viscosity of the liquid crystal, which is generally around 15 to 20 mm$^2$/sec.

When values of ρp=1.3, ρf=1.0, Dp=6 μm, and μ=15 mm$^2$/sec are substituted in the above equation, the falling speed of the spacer is obtained as 0.4 (μm/sec). This result shows that it takes 250 sec to fall a distance of 100 μm. This falling speed seems not so effective in the practical display operation.

Figure 6:
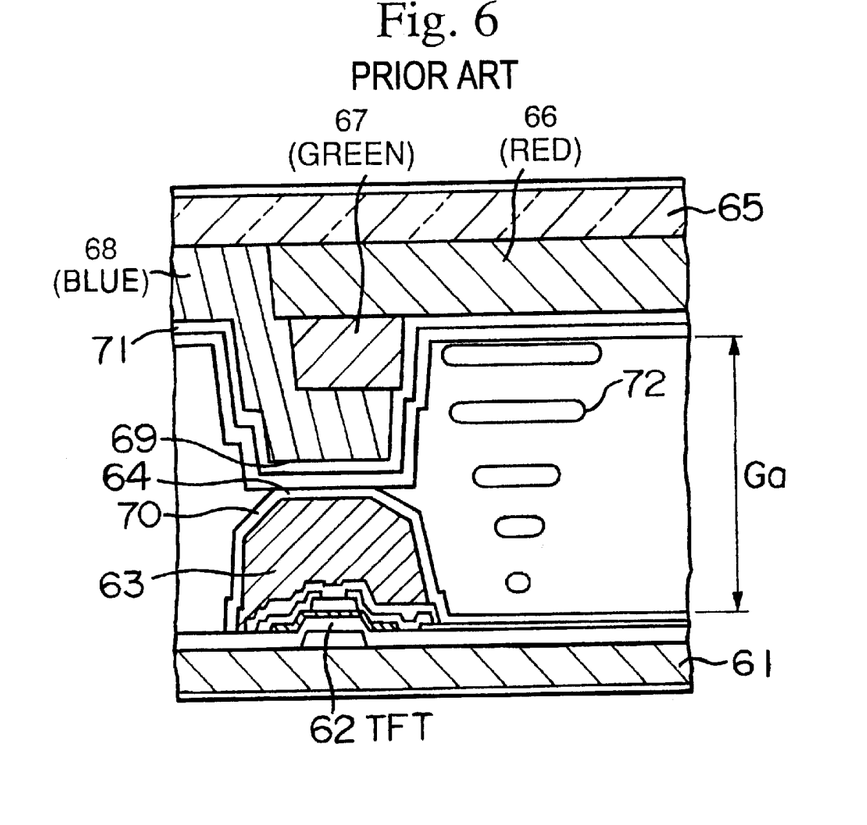
FIG. 6 is a diagram of a conventional example shown in the Japanese Patent Application, First Publication No. Hei 8-62606.

In turn, as shown in FIG. 6, a technique to maintain cells at a fixed value without using spacers is proposed in Japanese Patent Application, First Publication No. Hei 7-28119.

This proposal is related to the TN mode liquid crystal panel, and a first projection is mounted for forming cell gaps at the black-matrix 63 formed in the TFT 62 on the arrayed substrate 61. On the opposing substrate 65 for forming CF (Color Filters), a second projection is formed by laminating the red layer 66, green layers, and the blue layers. The first projection and the second projection have a height which corresponds to a half of the cell gap Ga. Therefore, the orientation films 70 and 71 can be sufficiently subjected to the rubbing treatment, so that the TN liquid crystal molecules 72 are ensured to be lined up in a regular pattern. Thereby, it is possible to prevent the anomalous orientation and thus the light leakage by the liquid crystal panel in which it is not necessary to use the spacers.

In the above disclosure, if the height of the projection is higher than 5 μm or more, the rubbing treatment is then not sufficiently executed because a part is hidden by the projection causing irregular orientation of the liquid crystal. In order to avoid this, the height of the projections is limited to less than 3.8 μm.

In the liquid crystal panel driven by the transverse electric field, beside the problem that it is hard to arrange the liquid crystal molecules in a predetermined direction, there is an important problem concerning a force of constraint for constraining the liquid crystal molecule in a predetermined direction. If the force of constraint in a predetermined direction (hereinafter referred to as an orientation restraining force) is weak, a picture image after switching from displaying another picture image will contain the after-image of the previous image. Therefore, the orientation restraining force has an affect on the image quality.

As described hereinabove, the liquid crystal panel driven by the transverse electric field has many problems that must be solved. In contrast, the liquid crystal panel driven by the transverse electric field has the advantageous feature that the wide display image plane with a wide angle of visibility is obtained.

It is therefore an object of the present invention to provide a liquid crystal display device with a wide display image plane and with a wide angle of visibility having a good cell image quality by preventing a light leakage around the spacers for maintaining a fixed cell gap and by preventing after images due to the weak orientation restraint force.

SUMMARY OF THE INVENTION

The liquid crystal display panel of the present invention comprises:

an array substrate having switching elements disposed in an matrix form and an orientation film formed on the uppermost layer;

an opposing substrate having a light shielding layer and the color layers and an orientation film on the uppermost layer of those films and the color layers, in which the area excluding the area covered by said light shielding layer is turned into the display area; and a liquid crystal layer formed in between said array substrate and said opposing substrate;

wherein the cell gap of said display area is formed so as to be larger than the diameter of the spacers, and the cell gap at the color layer area overlapping the light shielding layer is formed so as to be smaller than the diameter of the spacer, such that said spacers in said smaller cell gap are held at the compressed state between said array substrate.

In this construction, said color layer is formed elevated above said display area such that the cell gap forms a step between the display area and said color layers.

Furthermore, said color layer area is formed in the form of stripes and the opposing substrate is formed so as to form a step between a display cell portion and a color filter portion, wherein the color filter portion is formed higher than said display cell portion.

In contrast, a method of manufacturing the liquid crystal panel comprising the steps of:

forming an array substrate by arranging switching elements in the matrix form and forming an orientation film on the uppermost layer of said switching elements;

forming an opposing substrate by forming a light shielding film and color layers and forming a display cell portion on said color layer portion by forming the orientation film on said display cell portion; and forming by inserting a liquid crystal in between said array substrate and said opposing substrate;

wherein a step is formed such that said cell gaps of said display cell portion on the opposing substrate are larger than that of the spacer diameter, and the cell gap of the color layers corresponding to the light shielding layer is made smaller than the spacer, and the height difference between said higher display portion and said lower color portion is formed so as to define the polarization anisotropy of said orientation film.

According to the above structure and the method of manufacturing, the cell gap of the display cell portion is formed higher than the spacer diameter as much as 0.3 μm, the liquid crystal molecules around the spacer are not subjected to the anomalous orientation, so that the light leakage is prevented. Furthermore, the after image due to the orientation restraining force is prevented in a liquid crystal display panel of a-Si TFT driven by an IPS (transverse electric field).

DETAILED DESCRIPTION OF PREFERRED EMBODIMENTS

The liquid crystal display panel driven by the transverse electric field (abbreviated to IPS) according to an embodiment of the present invention will be described hereinafter referring to attached drawings.

Figure 1A:
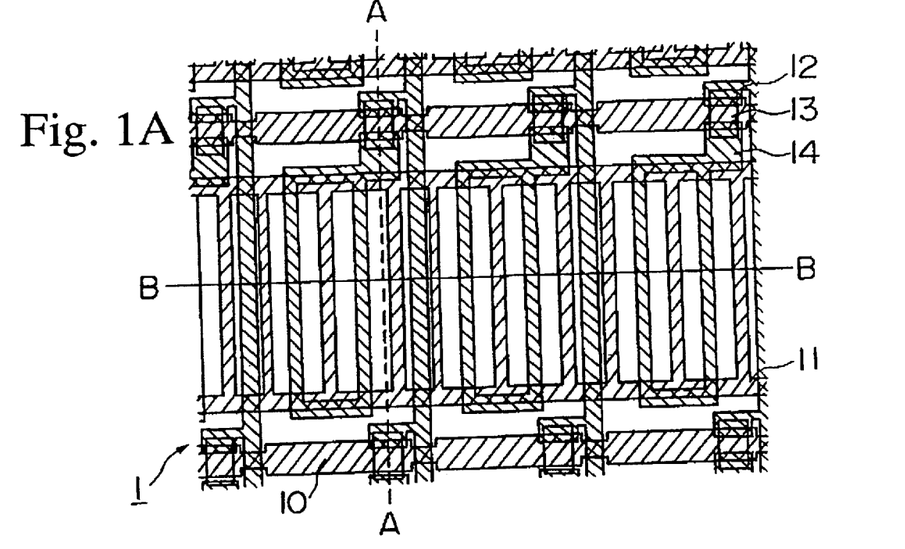
FIGS. 1(a) and 1(b) are planar views showing an array substrate and an opposing substrate of an IPS type a-Si TFT liquid crystal panel as an embodiment of the liquid crystal display panel of the present invention.
Figure 1B:
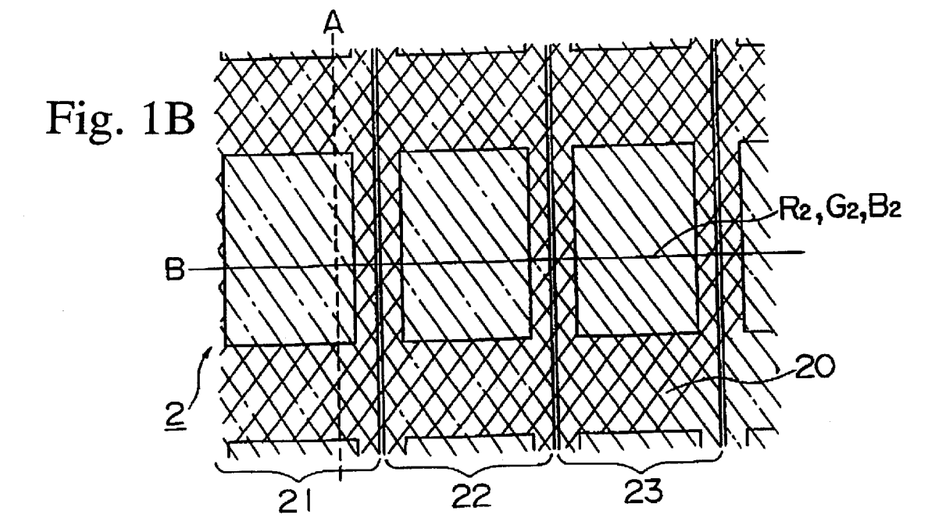
Figures 2A, 2B:
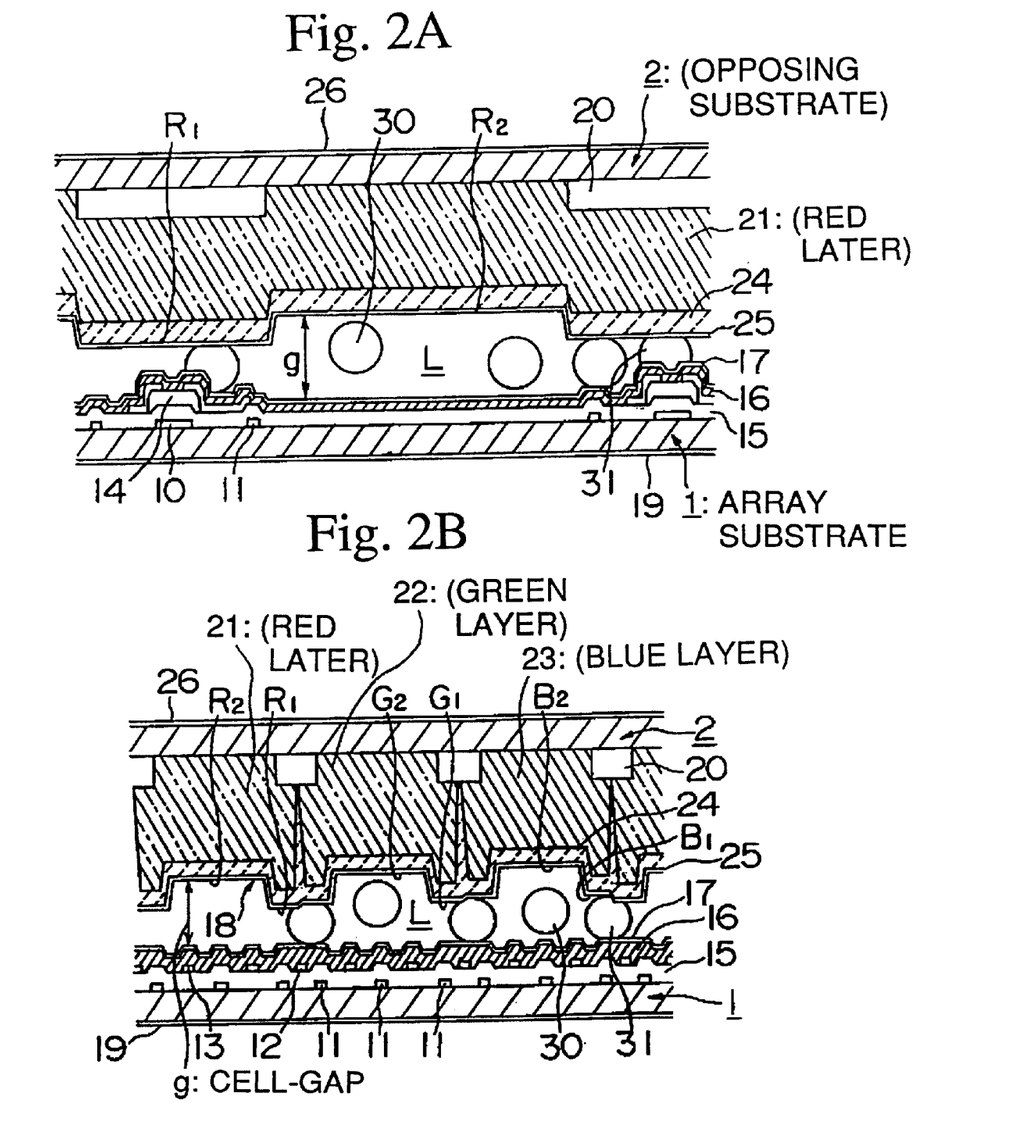
FIGS. 2(a) and 2(b) are cross sectional views of FIGS. 1(a) and 1(b) sectioned by line A—A and line B—B of FIGS. 1(a) and 1(b).

FIGS. 1(a) and 1(b) illustrate a pair of glass substrates facing each other at a predetermined distance. FIG. 1(a) shows a enlarged planar view of the array substrate 1, in which active matrix type TFTs for switching elements are formed. FIG. 2(b) shows an enlarged planar view of the opposing substrate 2 to the array substrate 1, in which color filters are formed. The array substrate 1 is depicted in view of the film surface, and the opposing substrate is depicted in view of the glass substrate side. FIGS. 2(a), 2(b) are cross-sectional views corresponding to line A—A and line B—B of FIGS. 1(a) and 1(b).

The channel carved type amorphous silicon (a-Si) TFTs are used for as TFT elements of the liquid crystal panel driven by the transverse electric field, and color layers formed in the form of stripes are used as the opposing substrate 2. This is called hereinafter an IPS type a-Si TFT liquid crystal panel for convenience.

A method of manufacturing the IPS type a-Si TFT liquid crystal display panel will be described referring to FIGS. 1 and 2.

A non-alkali glass plate with a thickness of 0.7 mm is used for the array substrate 1. IPS type TFTs are formed on this array substrate 1. The structure of the TFT when viewed from the glass substrate is formed in the following order.

A gate electrode 10 and the common electrode 11 are formed at the side surface of the array substrate 1 by patterning metallic chromium Cr. The thichness of these electrodes are commonly about 2000 Å, and an interlying insulating film of a silicon nitride film is formed at a thickness of 4000 Å. On the interlying insulating film, a semiconductor film by an amorphous silicon (a-Si) is formed at a thickness of 4000 Å.

After deposition of the semiconductor film, a source electrode and a source electrode are formed thereon. The semiconductor film is subjected to etching to form a channel 14, and the a-Si TFT are formed.

On the array substrate formed by the above process is completed by forming the protective insulating layer (passivation film) 16 using silicon nitride. On the uppermost layer of the array substrate 1, the orientation film 17 is formed at a thickness of 500 Å.

In turn, a non-alkali glass plate with a thickness of 0.7 mm is used for the opposing substrate, and, on a surface of the substrate, a light shielding film 20 is formed made of an acrylic resin with dispersed carbon in a predetermined area corresponding to the gate electrode 10 and the drain electrode 13 and their surroundings of the array substrate at a thickness of 0.6 µm.

After forming the light shielding film 20, color layers are arranged so as to cover corresponding areas of the light shielding film and the display pixel area 18. The color layers contain red layers 21, green layers 22 and blue layers 23. The color layers are formed by a pigment dispersed acrylic resin. The thickness of respective color layers are defined as 1.4 µm for the red layer 21, 1.3 µm for the green layer 22, and 1.2 µm for the blue layer 23. An overcoat film 24 is coated on all of these color layers. A transparent acrylic resin is used for the overcoat and its thickness is defined as 1.0 µm. In addition, an orientation film 25 is coated on the overcoat film 24.

The orientation films 17 and 25 respectively applied for the array substrate 1 and the opposing substrate 2 are the main chain-type polyimide film in which a tilt generating component is added to its main chain. The imidization is conducted at a temperature of 230° C. for 2 hours. The rubbing cloth used for orientation of the polyimide film is a flocked fabric flocked with a 24,000 strings/cm$^2$ of rayon strings with a filament diameter of 2.5 denier, a pile diameter of 120 denier, and a pile length of 1.85 mm. The rubbing was performed by a rubbing role with a role diameter of 150 mm, by an pile force of 0.5 mm, at a role revolution of 1,000 rpm, and at a table speed of 10 mm/sec. The direction of rubbing for the array substrate is set anti-parallel to that for the opposing substrate.

Subsequently, the array substrate 1 and the opposing substrate 2 are adhered and liquid crystal is injected in the space between two substrates and sealed to form the liquid crystal layer L. An all fluorine-type nematic liquid crystal containing no chiral material is used for the formation of this liquid crystal. Divinylbenzene type spacers 30 and 31 are installed for maintaining the fixed cell gap.

The cell periphery of both of the array substrate 1 and the opposing substrate 2 are sealed by curing a thermosetting sealing material. An epoxy type sealing material is used as the sealing material. The thermosetting condition at the sealing is 170° C. for 2 hours. A pressure of 500 g/cm$^2$ was applied to the panel during the sealing.

Polarizing plates 19 and 26 are disposed at respective rear sides of both array substrate 1 and the opposing substrate 2. The patching disposition of the polarizing plates are decided in the direction to realize the normally-black mode.

The height of the sum of layers formed in the cell are as follows. On the array substrate, the maximum thickness is 1.4 µm at the TFT region, and the thickness at the region of the common electrode 11 and the drain electrode 13 is 0.8 µm. Thus, the difference of the thickness between the thickest region of TFT and the display pixel region is designed to be 0.6 µm.

On the opposing substrate 2, the difference of the heights of the region where the light shielding film 20 overlaps with the red layer 21, G1, (hereinafter, called "the red corner portion") and the red display pixel region R2 is 0.6 µm. Similarly, the difference of the height between the region where the light shielding film 20 overlaps with the green layer 22 G1 (hereinafter, called "the green corner portion") and the height of the green display pixel area G2 is 0.6 µm, and the difference of the height between the region where the light shielding film 20 overlaps with the blue layer 23, B1, (hereinafter called "the blue corner region) and the blue display pixel region is 0.6 µm.

Furthermore, when comparison is made of the heights between the red corner region G1, the green corner region G1, and the blue corner region B1, the red corner region is the highest and the height then decreases in the order of the green corner region and the blue corner region. Those corner layers are formed so as to have respective height differences of 0.1 µm.

In this embodiment, the diameter of the spacer is set to 5.5 μm, and the cell gaps g are varied by changing the number of spacers scattered in the cell from 5- to 300 pieces/cm². The evaluation is made by observing a rate of occurrence of the light leakage of the liquid crystal around spacers (the anomalous orientation) under a microscope when the completed panel is tapped for 20 times for five points including a center and four corners by a rubber made hammer at a force of 2.55 kg. The whole area of the panel was observed with 300 spacers for each color. The measurement of the cell gaps is executed by means of the He—Ne laser, the beam diameter of which is 50 μm. The measurement is conducted by Senarmont method.

Figure 3:
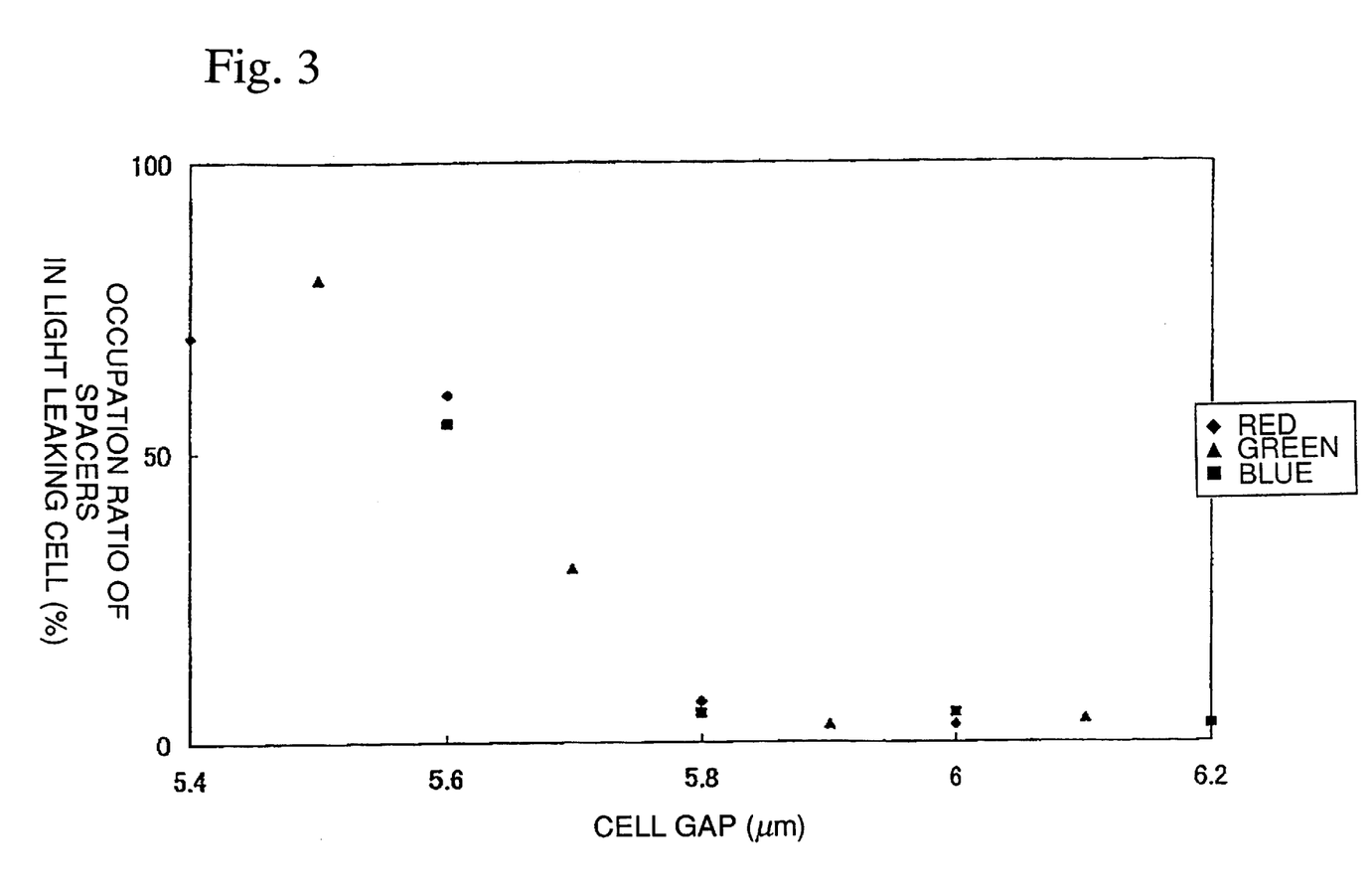
FIG. 3 is a graph showing a relationship between the cell-gap and occupation ratio of light leaking spacers.

As shown in FIG. 3, it is understood that the rate of occurrence of the light leakage for every color layer reduces rapidly reaching to a minimum value when the cell gap g reaches more than 5.8 μm, that is, the cell gap is larger than the spacer diameter by 0.3 μm or more.

The reason for the above result is that, although spacers located at the color corner layers of the opposing substrate 2, that is, spacers located at the light shielding layer are held in a compressed and deformed state, the diameters of spacers located at the red layer are smaller than the cell gap g, so that they are freely movable in the panel when a external force is applied to the panel. Thus, liquid crystal molecules around spacers will not be subjected to the anomalous orientation which causes the leakage of light.

Figure 4:
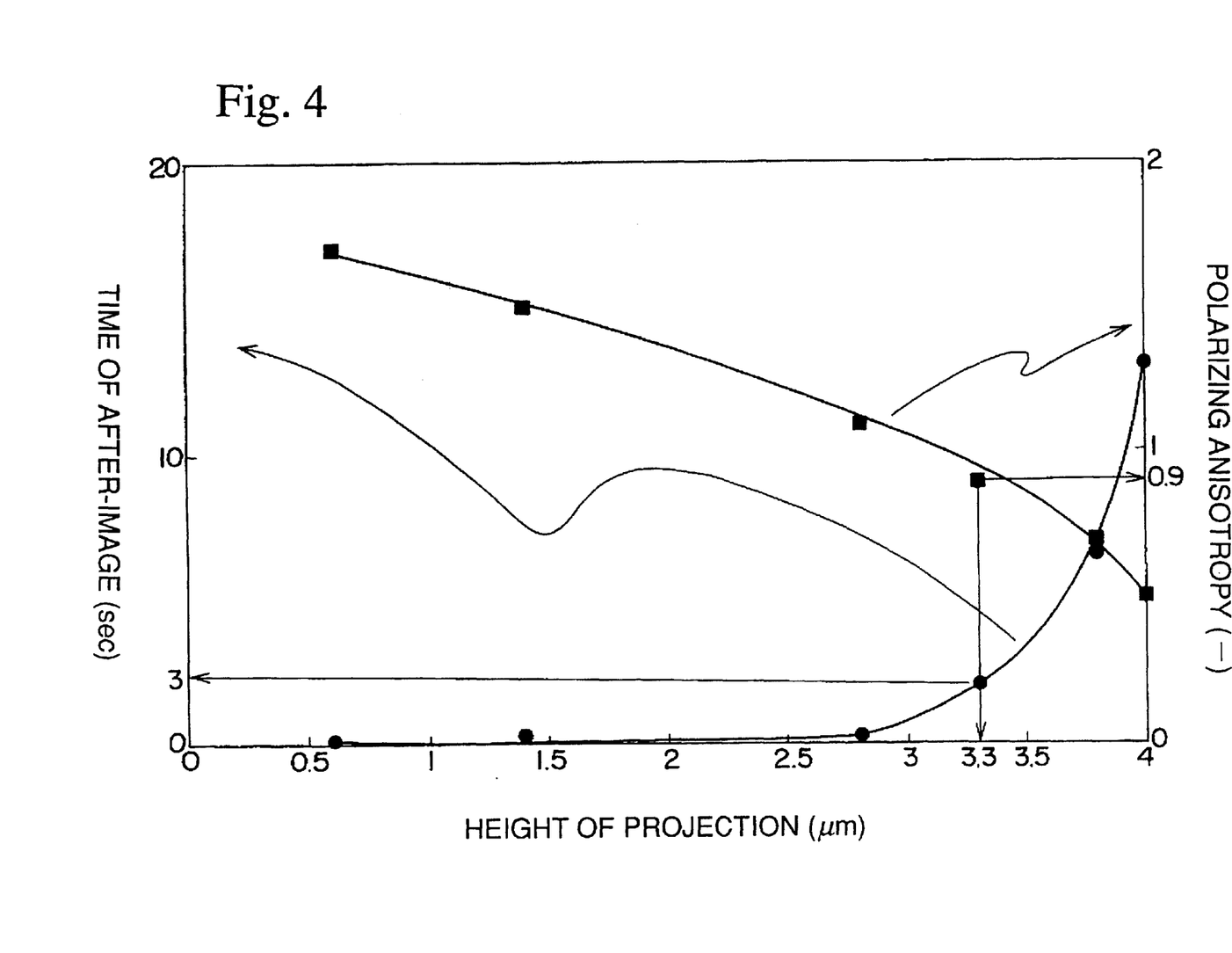
FIG. 4 is a graph showing the relationship between the height of cell projections, the time of the after-image, and the polarization anisotropy in an another embodiment of the present invention.

FIG. 4 shows a second embodiment of the present invention. The cell construction and the materials of this embodiment are the same as those of the first embodiment, except that the thickness of the light shielding film is changed from 0.6 to 4.0 μm, and that the height of projections are changed.

The cell gap is set as a whole at 6.0 μm, on the basis of the red display cell used as a standard. The cell gap is controlled by adjusting the number of spacers in the panel and by controlling the pressure applied on the panel during sealing.

FIG. 4 is a graph showing the relationships between the height of the projection, the time of the after-image, and the polarization anisotropy. The after-image is measured by visually measuring the remaining time of a black and white pattern after switching to the all black pattern after the black and white pattern with 10 mm intervals is displayed in a liquid crystal panel for 30 seconds.

The measurement of the polarization anisotropy is performed by the rotary phase-shifter method (refer to Japanese patent Application, First Publication No. Hei 8-49320). The measurements are executed by ellipsometry for a portion in a red display area R2 and for an area of a shadow remained without rubbing by the rubbing treatment. The light source is the He—Ne laser, the incident angle is 50 degree, and the spot size is 30 μm. The measurement is performed for 72 points by rotating the stage at every 5 degrees for 360 degrees. The polarization anisotropy shown in FIG. 4 is a difference between the maximum and minimum values of the phase components in the reflected light.

It is understood that the sufficient orientation restraint force is obtained because the after image remains less than 3 seconds, if the height of the projection is less than 3.3 μm, and the polarization anisotropy is less than 0.9.

A test is made to change the color layer projection from 0.6 to 4.0 μm, and it is confirmed that the liquid crystal molecule located at an area hidden by the projection by rubbing is oriented in a predetermined direction for every test heights of the projections.

Experimental work was performed by changing the kind of the orientation film in the same condition as the second embodiment. The kind of the orientation film used in this experiment is the side chain type polyimide in which the tilt generating component is added to its side chain.

The result of the experiment reveals that the height of the projection should be less than 3.3 μm and the polarization anisotropy should be more than 1.0, for suppressing the after image within less than 3 seconds. In this experiment also, the phenomenon that the liquid crystal molecules can not be oriented at a hidden area by the color layer projection was not observed for any experimental height of the projections.

As hereinabove described, the liquid crystal panel according to the present invention is suitable for the IPS-type (driven by the transverse electric field) a-Si TFT driven liquid crystal, and the cell gap of the display cell portion is formed larger than the diameter of the spacers by 0.3 μm or more, so that no anomalous orientation occurs around the spherical spacers such that the leakage of light is eliminated. In addition, the after-image due to the orientation restriction force which is characteristic to the IPS type a-Si TFT liquid crystal display panel can be eliminated by defining the height of the projection of the color layers. These effect allow production of a large diameter liquid crystal display panel with a wide angle of visibility as well as a extremely high image quality.

What is claimed is:

1. A method of manufacturing a liquid crystal display panel, comprising:
   forming a first substrate having a plurality of switching devices;
   forming a second substrate having light shielding regions of a first thickness and display regions of a second thickness;
   positioning a plurality of spacing devices between said first substrate and said second substrate;
   proximally positioning first surfaces of the first substrate and the second substrate with respect to each other; and
   injecting a liquid crystal between said first substrate and said second substrate to form a liquid crystal layer, wherein said spacing devices are positioned in said display regions after said proximally positioning of said first surfaces, and have a diameter greater than a first gap between said light shielding regions and the first surface of the first substrate and less than a second gap between said display regions and the first surface of the first substrate.

2. The method of claim 1, wherein the step of forming said first substrate comprises:
   forming a control electrode at a side surface of an array substrate;
   forming an insulating film on said control electrode;
   forming a semiconductor film on said insulating film;
   forming first and second electrodes on said semiconductor film; and
   etching a channel in said semiconductor film.

3. The method of claim 2, wherein said control electrode is formed by patterning metallic chromium.

4. The method of claim 2, further comprising forming a passivation film on the first substrate.

5. The method of claim 1, wherein the step of forming said second substrate comprises:
   forming a light shielding film on predetermined areas of an opposing substrate; and
   forming a plurality of color layers on the opposing substrate and the light shielding film, one of said color layers differing in thickness from other said color layers.

6. The method of claim 5, wherein the step of forming said plurality of color layers includes sequentially forming a red layer, a blue layer, and a green layer.

7. The method of claim 6, wherein said red layer has a greater thickness than said green layer, and said green layer has a greater thickness than said blue layer.

8. The method of claim 5, further comprising forming an overcoat layer on a first surface of said second substrate.

9. The method of claim 1, further comprising forming a first orientation film on the first substrate and a second orientation film on the second substrate.

10. The method of claim 9, further comprising:

forming a passivation film between the first substrate and the first orientation film; and forming an overcoat layer between the second substrate and the second orientation film.

11. The method of claim 1, further comprising:

forming first and second polarization plates on respective outer surfaces of the first substrate and the second substrate; and sealing a peripheral area of said first polarizer and said second polarizer.

12. The method of claim 1, wherein said first thickness and said second thickness can be varied by changing a density of said spacing devices.

13. The method of claim 1, wherein a difference between said second gap and said diameter of said spacing devices is at least 0.3 $\mu$m.

* * * * *